Sept. 21, 1937.   A. A. ARVINTZ   2,093,398
FILLING CAP AND STRAINER DEVICE
Filed July 12, 1935
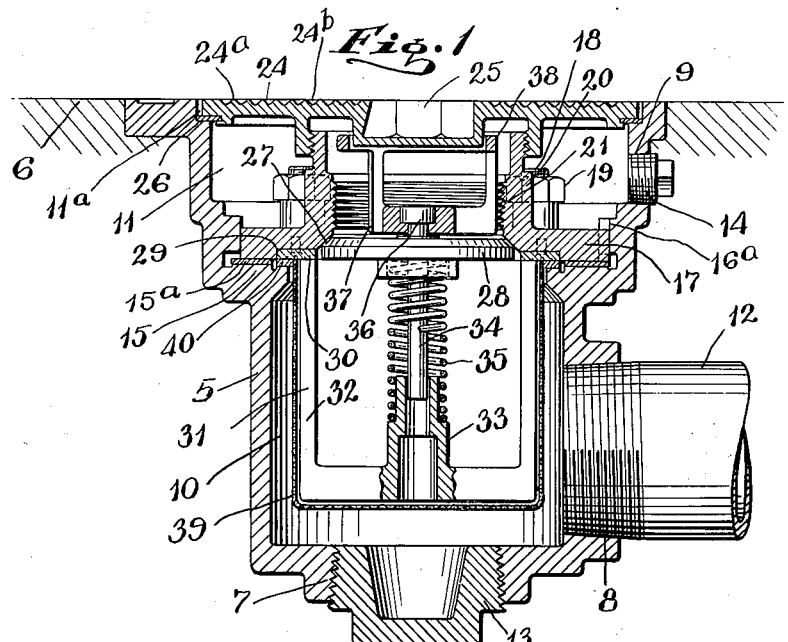
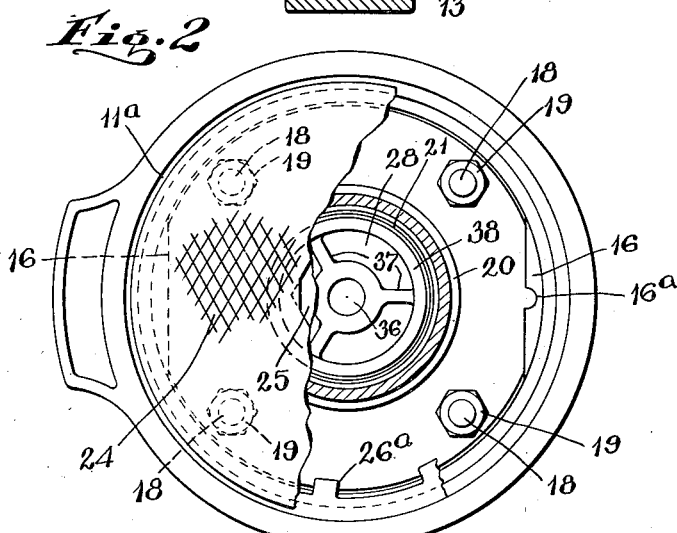
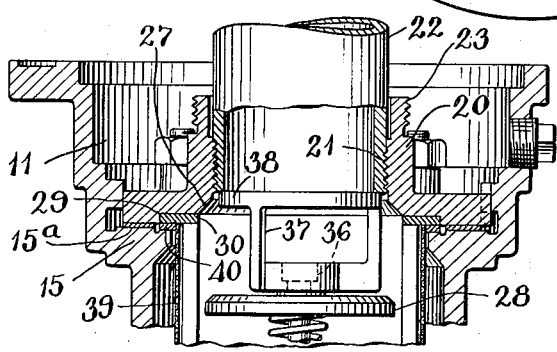
INVENTOR
ABRAHAM A. ARVINTZ
BY
ATTORNEY Patented Sept. 21, 1937

2,093,398

UNITED STATES PATENT OFFICE 2,093,398

FILLING CAP AND STRAINER DEVICE

Abraham A. Arvintz, Brooklyn, N. Y., assignor to Seal-O-Strain Corporation, Brooklyn, N. Y., a corporation of New York Application July 12, 1935, Serial No. 31,035

9 Claims. (Cl. 284—14)

This invention relates to devices for use in controlling the admission of gasoline, oil or other fluids into storage tanks of gas or oil stations; and the object of the invention is to provide a safety control device of this type which will meet and suit the specifications or requirements of fire underwriters from a standpoint of safety, the device being provided with an automatically seating valve controlling the admission opening into the tank or into a passage or pipe leading into the tank; a further object being to provide a device with means on the control valve whereby the insertion of a supply tube or pipe into the device will automatically move the valve into open position; a further object being to provide means for keying a valve seat plate to the body of the device whereby the stress or strain to which said plate is subjected in the attachment and detachment of a supply pipe therewith is taken up through the body of the device; a further object being to provide a device which is simple and economical in construction, efficient in use, and which is constructed as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a device made according to my invention indicating one method of its use.

Fig. 2 is a plan and sectional view of the construction shown in Fig. 1; and,

Fig. 3 is a view similar to Fig. 1 omitting parts of the construction and showing the valve in open position.

This application comprises an improvement on and continuation in part of my prior application for Letters Patent on improvements in Filling caps and strainer devices, filed December 19, 1934 and bearing Serial Number 758,168. In the present construction, I employ a casing 5 which is preferably countersunk in a pavement or other surface 6, the casing having threaded apertures 7, 8 and 9. The apertures 7 and 8 open into a large chamber 10 at the bottom of the casing whereas the aperture 9 opens into a chamber 11 in the top thereof. A pipe 12 is shown coupled with the aperture 8 for transmitting gas, oil or other fluid into a tank, not shown, it being understood that the pipe may be connected with the aperture 7 if desired as would be required in certain installations. However, in the accompanying drawing, a plug 13 is shown mounted in said aperture 7 and a plug 14 is shown mounted in the aperture 9. The aperture 9 is provided for the coupling of a pipe therewith, in certain installations, to detect overflow or other abnormal condition of the device.

The chamber 10 of the casing 5 joins the chamber 11 in a comparatively wide seat 15 above which opposed walls of the chamber 11 are provided with inwardly projecting lugs 16, one of which is recessed centrally as seen at 16a to form means for keying a valve seat ring or plate 17 against rotary movement within the casing. Mounted in the seat 15 are studs 18 which extend through the plate 17, and nuts 19 are employed to securely retain the plate upon the seat or a gasket 15a arranged thereon. It will appear that the gasket 15a extends beneath the projections 16 and this retains the gasket against displacement from the casing in the operation of removing the plate 17. Centrally of the plate 17 is an upwardly extending tubular portion 20 which is internally threaded as seen at 21 to receive a coupling or split tube 22 as indicated in Fig. 3 of the drawing. The sleeve 20 is also externally threaded at the upper end thereof as seen at 23 to receive a closure plate or cover 24 having a central depressed socket 25 to receive a suitable key permitting attachment and detachment of the cover. The cover 24 seats in a groove 11a formed in the casing 5 or upon a packing ring or gasket 26, the latter being held in position on the cover by an undercut ring 24a on the lower surface of the cover as clearly seen in Fig. 1 of the drawing. The inner edge of the gasket 26 has inwardly extending lugs 26a, note Fig. 2 of the drawing, to flexibly pass within the groove of the ring 24. The upper surface of the cover 24 is recessed as indicated at 24b in Fig. 1, to provide a rough or non-slip upper surface to said cap.

At the lower end of the tubular portion 20 of the plate 17 is a beveled valve seat 27 in connection with which a valve 28 operates to close the communication between the chambers 10 and 11. Outwardly of the seat 27 is a narrow annular groove 29 in which is seated the ring 30 of a valve guide frame 31. This frame has a plurality of arms 32 depending from the ring and extending radially to form a central tubular portion 33 in which the stem 34 of the valve is guided. A spring 35 is employed to normally support the valve in seated position. Centrally of the upper surface of the valve 28 is a stud 36 on which is rotatably mounted an openwork frame 37 having at its upper end a ring 38 adapted to be engaged by the tube or coupling 22 in mounting the same in the device to depress the valve 28 into the position shown in Fig. 3 without imparting rotary movement to said valve, it being understood that the frame 37 is free to rotate on the stud 36. I also employ a cup-shaped strainer body 39 of mesh fabric which entirely envelops the frame 31, the upper end of the strainer body having a ring 40 which is disposed between the seat 15 and the ring 30 as clearly seen in Fig. 1 of the drawing.

The device as shown in Fig. 1 of the drawing is mounted in a floor, pavement or other surface, and the casing 5 or the chamber 10 thereof is placed in communication with a storage tank through the pipe 12 which may be coupled with the threaded aperture 8, or, in some installations, with the aperture 7. Again, in some installations, it is desirable to attach a vent tube, not shown, to the threaded aperture 9, in which event the plug 14 is removed. In the use of the device, the valve 28 is normally retained in its closed or seated position by the spring 35.

When it is desired to transmit gasoline, oil or other fluid into the device and outwardly through the pipe 12, the cover 24 is first removed, after which the intake pipe or coupling 22 is coupled with the tubular portion 20 of the plate or ring 17 in the manner illustrated in Fig. 3 of the drawing, in which operation, the inner end of the tube or coupling 22 engages the ring 38 of the member 37 and causes the valve 28 to be moved into its open position as seen in said figure, and the gas, oil or other fluid is then permitted to pass from the tube or coupling 22 into the chamber 10, passing through the strainer body 39, and then is discharged into the tank or reservoir, not shown, through the pipe 12. In the above operation of screwing the pipe or coupling 22 into position, the key surfaces 16, 16a will take up any stress or strain that may be applied to the plate or ring 17 and eliminate any possibility of shearing the bolts or studs 18. With the present construction, all of the parts of the device are disposed flush with or inwardly of the upper surface of the pavement or other support 6 and therefore, will not be subjected to any breakage. The cover 24 and the method of its mounting are strong enough to resist any normal pressure to which the cover might be subjected, even though it be imbedded in a surface over which heavy traffic is likely to pass.

The entire device is of simple and economical construction and by reason of the simplicity of the respective parts, the device will be substantially fool-proof in operation. It will be understood that slight changes in the design and size of the respective parts may be made within the scope of the present invention.

Having fully described my invention, what I claim as new and desire to secure by Letters Patent, is:

1. A device of the class described, comprising a substantially cup-shaped casing having upper and lower chambers divided by a relatively wide seat, a ring mounted on and secured to said seat and including an outwardly extending tube contained within the boundaries of said casing, means for detachably coupling a fluid admission member with said tube, a valve seat on said ring, a valve movably mounted in the lower chamber of the casing and engaging said valve seat to control the communication between the upper and lower chambers of said casing, means supported in connection with said ring for guiding said valve in its movement and for actuating the same in one direction, and said ring and the inner wall of the casing having cooperating flat surfaces for keying said ring against rotation in said casing.

2. A device of the class described, comprising a substantially cup-shaped casing having upper and lower chambers divided by a relatively wide seat, a ring mounted on and secured to said seat and including an outwardly extending tube contained within the boundaries of said casing, means for detachably coupling a fluid admission member with said tube, a valve seat on said ring, a valve movably mounted in the lower chamber of the casing and engaging said valve seat to control the communication between the upper and lower chambers of said casing, means supported in connection with said ring for guiding said valve in its movement and for actuating the same in one direction, said ring and the inner wall of the casing having cooperating flat surfaces for keying said ring against rotation in said casing, and said valve guiding means comprising an openwork frame, arranged in spaced relation to the walls of the lower chamber of said casing.

3. A device of the class described comprising a substantially cup-shaped casing having upper and lower chambers divided by a relatively wide seat, a ring mounted on and secured to said seat and including an outwardly extending tube contained within the boundaries of said casing, means for detachably coupling a fluid admission member with said tube, a valve seat on said ring, a valve movably mounted in the lower chamber of the casing and engaging said valve seat to control the communication between the upper and lower chambers of said casing, means supported in connection with said ring for guiding said valve in its movement and for actuating the same in one direction, said ring and the inner wall of the casing having cooperating flat surfaces for keying said ring against rotation in said casing, said valve guiding means comprising an openwork frame, arranged in spaced relation to the walls of the lower chamber of said casing, and means including an openwork member supported in connection with said valve and having a circumferential band at the outer end portion thereof for moving the valve into open position on the insertion of a fluid admission tube into the tubular portion of said first named ring.

4. A filling device of the class described comprising a cup-shaped casing, a member detachably mounted in the casing for coupling an admission pipe or tube therewith, said member being arranged within the upper open end of the casing, one side edge of said member having a flat wall engaging a corresponding flat inner surface on the casing for keying said member against rotation with respect to the casing, and other means for detachably coupling said member with the casing and for retaining the same against longitudinal movement in the casing.

5. A filling device of the class described comprising a substantially cup-shaped casing having a wide upper chamber and a narrower lower chamber, said chambers being subdivided by a wide seat formed in said casing, a member arranged in the upper chamber of the casing and upon said seat, said member including an upwardly extending tubular portion arranged centrally thereof, a valve seating in the lower end of the tubular portion of said member, means whereby a fluid admission tube may be coupled with the tubular portion of said member to transmit fluid into the lower chamber of the casing, means coupled with the wall of the casing and communicating with the lower chamber thereof for discharging fluid therefrom, and the periphery of said member having a flat surface cooperating with a corresponding flat surface on the wall of said casing for keying said member against rotation in said casing.

6. A filling device of the class described comprising a substantially cup-shaped casing having a wide upper chamber and a narrower lower chamber, said chambers being subdivided by a wide seat formed in said casing, a member arranged in the upper chamber of the casing and upon said seat, said member including an upwardly extending tubular portion arranged centrally thereof, a valve seating in the lower end of the tubular portion of said member, means whereby a fluid admission tube may be coupled with the tubular portion of said member to transmit fluid into the lower chamber of the casing, means coupled with the wall of the casing and communicating with the lower chamber thereof for discharging fluid therefrom, the periphery of said member having a flat surface cooperating with a corresponding flat surface on the wall of said casing for keying said member against rotation in said casing, and means comprising studs mounted in the casing and extending through said member outwardly of the tubular portion thereof for retaining said member against longitudinal movement in said casing.

7. A filling device of the class described comprising a substantially cup-shaped casing having a wide upper chamber and a narrower lower chamber, said chambers being subdivided by a wide seat formed in said casing, a member arranged in the upper chamber of the casing and upon said seat, said member including an upwardly extending tubular portion arranged centrally thereof, a valve seating in the lower end of the tubular portion of said member, means whereby a fluid admission tube may be coupled with the tubular portion of said member to transmit fluid into the lower chamber of the casing, means coupled with the wall of the casing and communicating with the lower chamber thereof for discharging fluid therefrom, the periphery of said member having a flat surface cooperating with a corresponding flat surface on the wall of said casing for keying said member against rotation in said casing, means comprising studs mounted in the casing and extending through said member outwardly of the tubular portion thereof for retaining said member against longitudinal movement in said casing, a valve guiding frame mounted in the lower chamber of the casing, and said frame including at its upper end a ring countersunk in and secured to said member.

8. A filling device of the class described comprising a substantially cup-shaped casing having a wide upper chamber and a narrower lower chamber, said chambers being subdivided by a wide seat formed in said casing, a member arranged in the upper chamber of the casing and upon said seat, said member including an upwardly extending tubular portion arranged centrally thereof, a valve seating in the lower end of the tubular portion of said member, means whereby a fluid admission tube may be coupled with the tubular portion of said member to transmit fluid into the lower chamber of the casing, means coupled with the wall of the casing and communicating with the lower chamber thereof for discharging fluid therefrom, an openwork body movably mounted on and supported by said valve and arranged within said tubular portion, and said body including at its upper end an annular ring adapted to be engaged by the fluid admission tube when inserted into and coupled with said tubular portion to move said valve into open position and permit the transmission of fluid into the lower chamber of said casing.

9. A filling device of the class described comprising a substantially cup-shaped casing having a wide upper chamber and a narrower lower chamber, said chambers being subdivided by a wide seat formed in said casing, a member arranged in the upper chamber of the casing and upon said seat, said member including an upwardly extending tubular portion arranged centrally thereof, a valve seating in the lower end of the tubular portion of said member, means whereby a fluid admission tube may be coupled with the tubular portion of said member to transmit fluid into the lower chamber of the casing, means coupled with the wall of the casing and communicating with the lower chamber thereof for discharging fluid therefrom, an openwork body movably mounted on and supported by said valve and arranged within said tubular portion, said body including at its upper end an annular ring adapted to be engaged by the fluid admission tube when inserted into and coupled with said tubular portion to move said valve into open position and permit the transmission of fluid into the lower chamber of said casing, an openwork frame supported in connection with said member and extending into the lower chamber of the casing, said frame serving to guide the valve in its movement in the casing, and tensional means on said frame and cooperating with said valve to normally support the same in closed position.

ABRAHAM A. ARVINTZ.